United States Patent Office 3,018,305
Patented Jan. 23, 1962

3,018,305
α-PHENYLBEN-ZOYL-α-ARYLAMINOCARBINOL DERIVATIVES
Guido Cavallini and Elena Massarani, Milan, Italy, assignors to Francesco Vismara S.p.A., Casatenovo, Italy, a firm
No Drawing. Filed July 6, 1959, Ser. No. 824,927
Claims priority, application Great Britain May 21, 1959
8 Claims. (Cl. 260—519)

This invention is concerned with a new class of chemical compounds, namely α-phenylbenzoyl-α-arylaminocarbinol derivatives, having novel antiviral activity and with synthetic methods for preparing such compounds.

More specifically, the new compounds of this invention have a very pronounced chemotherapeutic activity, particularly in various viral infections such as distemper virus, influenza virus (PR8), hepatitis virus (MHV$_3$), neurotropic virus (CLM), Herpes simplex, adenovirus, Newcastle disease virus, Coxsackie virus, Echo virus and hemadsorption virus. Activity against the first four mentioned viral entities is exceptionally pronounced. Coupled with the chemotherapeutic activity of these compounds is a low order of toxicity.

The carbinol derivatives of this invention are represented by the following basic general formula:

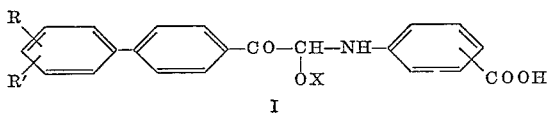
I where R represents hydrogen, halogen such as chlorine, fluorine, or bromine, hydroxy, lower alkoxy of 1 to 4 carbon atoms inclusive, lower alkyl of 1 to 4 carbon atoms or benzyloxy.

R$^1$ represents hydrogen or halogen such as chlorine, fluorine or bromine.

X represents hydrogen or a hydrocarbon radical of from 1 to 12 carbon atoms inclusive.

Advantageous compounds of this invention are represented by the following general formula:

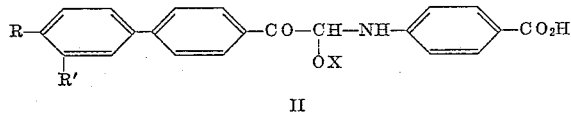
II where R represents hydrogen, halogen of atomic weight less than 80, hydroxy, methoxy or ethoxy, R$^1$ represents hydrogen or halogen of atomic weight less than 80, and X represents hydrogen, lower saturated or unsaturated aliphatic hydrocarbon radical of 1 to 8 carbon atoms, inclusive, or benzyl.

Preferred compounds of this invention are represented by Formula II where
R represents hydrogen, hydroxy or methoxy
R$^1$ represents hydrogen or chlorine
X represents hydrogen or lower alkyl of from 1 to 8 carbon atoms.

Particularly preferred and advantageous compounds are those in which R and R$^1$ are hydrogen and X is hydrogen or lower alkyl particularly methyl or ethyl.

The compounds of this invention are prepared by condensing either the alcoholate (hemiacetal) or hydrate addition compounds of a biphenylglyoxal with an aminobenzoic acid with elimination of one mole of water. Specifically, approximately molar equivalent amounts of the addition compound and the aminobenzoic acid in an inert organic solvent in which the reactants are substantially soluble are reacted at from about room temperature i.e. about 25° C. up to the boiling point of the solvent employed for periods of from about 15 minutes to about 24 hours. An excess of either reactant can be employed but with little advantage. The reaction time can vary greatly depending on the reaction temperature as well as the chemical nature of the reactants but reaction temperatures outside of those detailed here are usually of no particular advantage. Preferably the reaction time is from about ½ to 8 hours at temperatures from about 40–100° C. The organic solvent for preparing the ether derivatives is advantageously the alcohol corresponding to the alcoholate addition product involved; thus, for instance, if the alcoholate used as starting material is the methylate, it is advisable to use methyl alcohol as a reaction diluent. If an alcoholate is used, it is preferred to exclude water from the reaction medium. If a hydrate addition compound is used as starting material for preparing a carbinol, non-alcoholic solvents, such as aryl solvents for instance benzene or toluene, ethers or cycloalkane solvents are preferably used with alcohol being excluded. This latter restriction however is not a critical restriction on the method. The desired condensation product, a carbinol or its ether, is usually isolated by separating the crystallized solid by filtration following cooling. Alternatively the reaction solvent is removed by evaporation and the residue purified by recrystallization.

The reaction is illustrated by the following reaction sequence.

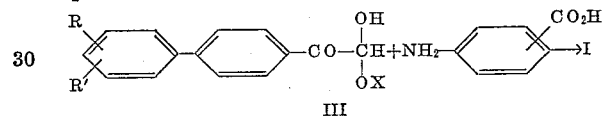
III

The starting material biphenylglyoxal hydrate or alcoholate addition compounds of Formula III in which R, R$^1$ and X are as defined above are prepared by reacting the glyoxal with water or an alcohol, usually at room or slightly elevated temperature such as up to about 100° C. in a suitable solvent as mentioned above. For example, the alcoholates are obtained by reacting a biphenylglyoxal, anhydrous or hydrate, with an alcohol under anhydrous conditions usually in an excess of the alcohol with gentle heating at about 60° C. The glyoxal gradually goes into solution. Cooling separates the desired alcoholate addition product.

Alternatively, the crystalline hydrate can be heated in an excess of alcohol in an anhydrous state with removal of the water formed via azeotropic distillation with a solvent such as benzene, xylene or toluene to give the desired alcoholate.

Certain of the intermediate compounds of Formula III have chemotherapeutic activity, particularly anti-viral activity against the viruses noted above, in their own right in addition to their value as intermediates. Preferred are those in which R is p-hydroxy or alkoxy, R$^1$ is hydrogen or halo and X is lower alkyl or hydrogen. These compounds are the subject of our copending application Serial No. 829,532, filed July 27, 1959.

The substituted biphenylglyoxal starting materials are either known per se or are prepared from easily available phenylacetophenone derivatives by oxidation such as with selenium dioxide. The corresponding acetophenone compounds are generally well-known in the prior art. In the rare instances in which they are not, a Friedel-Crafts acylation of a substituted diphenyl with acetyl chloride under standard conditions is easily carried out.

The new compounds of this invention can be used advantageously as prophylactic agents as well as chemotherapeutic drugs for both human and veterinary purposes in the treatment of viral infections and diseases. For example, the componnds of Formula II above where R and R' are hydrogen and X is a lower alkyl or hydrogen give striking results in the cure of clinical distemper in dogs.

The drugs have proved to be active at very low doses (even somewhat lower than about 20 mg./kg.) while on the other hand their toxicity becomes apparent at doses above 3000 mg./kg. The antiviral activity seems not to depend on the route of administration; therefore the new compounds can be given both by oral or subcutaneous routes. Especially by the oral route as capsules, tablets or the like, the compounds are administered as free acids combined with a pharmaceutical carrier. If the subcutaneous route is chosen it is advisable to employ an ester or, better, a nontoxic salt with a pharmaceutically acceptable base in order to facilitate the dissolution in the oily or aqueous vehicles of administration. In summary, therefore the compounds of this invention can be given to virus infected organisms or prophylactically to normal, exposed organisms either orally, intranasally or parenterally combined with an inert pharmaceutical carrier in an amount to cure or mitigate the course of virus infection. The dose range for daily regimen will be within that mentioned hereabove, namely from 15 mg./kg. to about 3000 mg./kg. depending on the size or species of animal.

The following examples will illustrate the novel aspects of this invention fully and enable one skilled in the art to practice this invention. Obviously other minor variations of this invention can be easily designed such as using unsymmetrical biphenylglyoxals to give o- and p-phenyl-benzoylarylaminocarbinols. Such variations are included in the scope of this invention.

*Example 1*

A mixture of 7.75 g. of selenium dioxide, 2 cc. of water and 20 cc. of dioxan is heated to 70° C. while a solution of 11.13 g. of 4-acetyl-4'-methoxybiphenyl in 60 cc. of dioxan is added dropwise. The mixture is heated at reflux for 5 hours, then filtered hot and partially evaporated. Cooling separates 4'-methoxybiphenylyl-4-glyoxal hydrate, M.P. 136–137° C.

A mixture of 8.0 g. of the glyoxal in 100 cc. of absolute ethyl alcohol is heated at reflux for several hours. The clear solution is evaporated slightly then cooled to give the desired ethylate, M.P. 119–120° C.

The ethylate (2.9 g.) and 1.45 g. of p-amino-benzoic acid in 50 cc. of absolute ethyl alcohol is heated at reflux for 5 hours. After slight evaporation, the solution is cooled to separate the desired ethyl ether of α-(p-4-methoxyphenylbenzoyl) - α - (4 - carboxyphenylamino)-carbinol, M.P. 224° C.

The ethyl ether (500 mg.) is dissolved in water containing one molar equivalent of sodium hydroxide. Evaporation gives the sodium salt.

*Example 2*

A mixture of 7.5 g. of anhydrous biphenlyl-4-glyoxal in 60 cc. of anhydrous methyl alcohol is heated at 60° C. with stirring until clear. Cooling separates the methylate, M.P. 95–96° C.

A solution of 4.8 g. of the methylate and 2.8 g. of p. aminobenzoic acid in 60 cc. of methanol is heated at 60° C. for 4 hours. Cooling separated the desired methyl ether of α-(p-phenylbenzoyl)-α-(4-carboxyphenylamino)-carbinol, M.P. 192–194° C.

*Example 3*

A mixture of 3.5 g. of biphenlyl-4-glyoxal hydrate (M.P. 114–117° C., prepared by reacting the glyoxal with an excess of water) and 30 cc. of anhydrous n-octyl alcohol in 100 cc. of anhydrous benzene is heated at reflux for 12 hours over a water trap (Org., Syn. 3, 382) having an inner funnel charged with a mixture of phosphorus pentoxide and a filter aid. The mother liquor is then concentrated in vacuo to give the n-octylate of biphenylyl-4-glyoxal, M.P. 54–58° C.

This compound, 3.5 g., is reacted in 150 cc. of benzene with 1.4 of p-aminobenzoic acid to give the desired n-octyl ether of α-(p-phenylbenzoyl)-α-(4-carboxy-phenylamino) carbinol, M.P. 134–136° C.

*Example 4*

A mixture of 3.7 g. of biphenylyl-4-glyoxal in 50 cc. of anhydrous allyl alcohol is heated at 60° C. for several hours to give the desired allylate, M.P. 93° C. This compound (2.7 g.) is reacted with 1.4 g. of p-aminobenzoic acid as in Example 2 to give the desired allyl ether of α-(p-phenylbenzoyl)-α-(4-carboxyphenylamino)-carbinol, M.P. 192–194° C.

*Example 5*

A mixture of 3.7 g. of biphenylyl-4-glyoxal and 30 cc. of propargyl alcohol in benzene is heated at reflux to give the desired proparglyate, M.P. 97° C. This compound (2.6 g.) is reacted with 1.4 g. of p-aminobenzoic acid at 60° C. for 1 hour to give the propargyl ether of α - (p - phenylbenzoyl) - α - (4 - carboxyphenylamino)-carbinol, M.P. 192–194° C.

*Example 6*

A mixture of 1.8 g. of biphenylyl-4-glyoxal and 20 cc. of isopropyl alcohol in benzene is reacted to give the desired isopropylate, M.P. 93–94° C. which (2.7 g.) is reacted with 1.4 g. of p-aminobenzoic acid as in Example 2 to give the isopropyl ether, M.P. 192–194° C.

In similar manner, the n-butylate is formed, M.P. 54° C. and reacted with o-aminobenzoic acid to form the butyl ether of α-(p-phenylbenzoyl)-α-(2-carboxyphenylamino)-carbinol as in Example 2.

Also the n-propylate is formed, M.P. 86–87° C., and reacted with m-aminobenzoic acid as in Example 2 to give the propyl ether of α-(p-phenylbenzoyl)-α-(3-carboxy-phenylamino) carbinol.

The ethylate is formed, M.P. 100–103° C., and reacted with an equimolar amount of p-aminobenzoic acid as in Example 2 to give the ethyl ether, M.P. 192–194° C.

*Example 7*

A mixture of 3.9 g. of selenium dioxide and 15 cc. of aqueous dioxan is reacted with 6.5 g. of 4'-acetyl-3-chloro-4-methoxybiphenyl (prepared by reacting acetyl chloride with 3-chloro-4-methoxybiphenyl under Friedel-Crafts conditions) in 40 cc. of dioxane as described in Example 1 to give the glyoxal as the hydrate, M.P. 141–142° C. This compound (5.5 g.) is reacted with 2.8 g. of p-aminobenzoic acid in benzene to give α(p-3-chloro-4-methoxyphenyl - benzoyl) - α - (4 - carboxyphenylamino) - carbinol after warming on the steam bath for 1 hour, M.P. 224–225° C.

*Example 8*

A mixture of 2.8 g. of the hydrate of 3'-chloro-4'-methoxybiphenylyl-4-glyoxal is reacted with ethyl alcohol as in Example 1 to give the ethylate addition compound, M.P. 85–87° C. This ether (3 g.) is reacted with 1.4 g. of p-aminobenzoic acid in absolute ethyl alcohol at 60° C. for 6 hours. Cooling separates the ethyl ether of α-(p-3-chloro - 4 - methoxyphenyl - benzoyl)-α-(4-carboxyphenylamino)-carbinol, M.P. 228° C.

A small portion of the ether (200 mg.) is dissolved in dry dioxane and reacted with metallic potassium to separate the potassium salt.

*Example 9*

A solution of 4.5 g. of 4'-hydroxybiphenylyl-4-glyoxal in 50 cc. of anhydrous ethyl alcohol is heated at reflux until clear. P-aminobenzoic acid (2.8 g.) is then added to the crude ethylate solution and the heating period extended for several hours. Cooling separated the ethyl ether of α-(p - 4 - hydroxyphenylbenzoyl)-α-(4-carboxyphenylamino)-carbinol, M.P. 216–217° C.

Example 10

A solution of 4.5 g. of 4'-chlorobiphenylyl-4-glyoxal in 50 cc. of anhydrous methyl alcohol is heated at 60° C. for several hours to give the methylate. This compound (2.7 g.) is heated at reflux in 75 cc. of methyl alcohol for an hour with 1.4 g. of p-aminobenzoic acid. Cooling after evaporation gives the desired methyl ether of α - (p-4-chlorophenylbenzoyl) - α - (4-carboxyphenylamino)-carbinol.

Example 11

A solution of 13.5 g. of 4-acetyl-3'-bromo-biphenyl and 7.75 g. of selenium dioxide in dioxan is heated at reflux for several hours. After filtration, the hot solution is cooled to separate the desired 3'-bromo-diphenylyl-4-glyoxal. This compound (6.4 g.) is reacted with 30 cc. of anhydrous methyl alcohol to give the methylate (5.4 g.) which is reacted with 2.8 g. of p-amino-benzoic acid in 50 cc. of methyl alcohol at reflux for 6 hours. Cooling separates the methyl ether of α-(p-3-bromo-phenylbenzoyl)-α-(4-carboxyphenylamino)-carbinol.

Example 12

A solution of 6.8 g. of biphenylyl-4-glyoxal in benzene is reacted with 30 cc. of benzyl alcohol at reflux for 6 hours. After working up as in Example 3, the benzylate is obtained, M.P. 86° C. This compound (3.2 g.) is reacted in benzene with 1.4 g. of p-aminobenzoic acid by heating briefly on the steam bath. The solid residue is the benzyl ether of α-(p-phenylbenzoyl)-α-(4-carboxyphenylamino)-carbinol, M.P. 184–186° C.

Example 13

A solution of 12.4 g. of 4-acetyl-4'-tert.-butylbiphenyl (prepared by the reaction of acetyl chloride with 4-tert.-butylbiphenyl under Friedel-Crafts conditions) is heated with 7.8 g. of selenium dioxide in dioxane for several hours as in Example 1. The free selenium is separated by filtration and the glyoxal separated from the solvent. The glyoxal (5 g.) is heated with 26 cc. of cyclohexanol in benzene as in Example 3 to give the cyclohexylate addition product. This compound is then reacted with an equivalent amount of p-aminobenzoic acid in benzene as in Example 1 to give the desired cyclohexyl ether of α-(p-4-tert.-butylphenyl-benzoyl)-α-(4-carboxy-phenylamino)-carbinol.

Example 14

A mixture of 11.4 g. of 4-acetyl-3'-chloro-2'-methyl-biphenyl (prepared by the Friedel-Crafts reaction as in Example 7) and 7 g. of selenium dioxide in dioxane is heated for several hours. The product, isolated as in Example 1, is 3'-chloro-2'-methylbiphenylyl-4-glyoxal. This compound (5.5 g.) is heated in 75 cc. of methyl alcohol for several hours then 2.8 g. of p-aminobenzoic acid is added to the alcoholic solution of the methylate compound and the reflux period continued. Cooling the filtered solution gives the methyl ether of α-(p-3-chloro-2 - methylphenylbenzoyl) - α - (4 - carboxyphenylamino)-carbinol.

Example 15

A solution of 5.4 g. of 4'-benzyloxybiphenylyl-4-glyoxal (prepared by reacting 4-hydroxybiphenyl with benzyl chloride under standard alkylation conditions, acetylating under Friedel-Crafts conditions and oxidizing selenium dioxide as in Example 7) in 75 cc. of ethyl alcohol is heated at 60° C. for 5 hours. Then an equimolar amount of p-aminobenzoic acid is added to the ethylate while the heating is resumed. Concentration gives the desired product, the ethyl ether of α-(p-4-benzyloxy-phenylbenzoyl)-α-(4-carboxyphenylamino)-carbinol.

Example 16

A solution of 5.4 g. of 3', 4'-dichlorobiphenylyl-4-glyoxal (prepared by Friedel-Crafts reaction on 4-acetyl-3',4'-dichlorobiphenyl followed by selenium dioxide oxidation in dioxan as in Example 1) in 100 cc. of methyl alcohol is heated at 60° C. for 4 hours. The product which crystallizes upon evaporation and cooling is the methylate. This compound (2.9 g.) is reacted in methyl alcohol with 1.4 g. of p-aminobenzoic acid at reflux for 2 hours. Cooling separates the methyl ether of α-(p-3,4-dichloro - phenylbenzoyl) - α - ( 4- carboxyphenylamino)-carbinol.

Example 17

A solution of 3.7 g. of biphenylyl-2-glyoxal is reacted with 50 cc. of methyl alcohol and then with 2.5 g. of p-aminobenzoic acid as in Example 2 to give the methyl ether of α-(o-phenylbenzoyl-α-(4-carboxyphenylamino)-carbinol.

Example 18

A mixture of 1.14 g. of biphenylyl-4-glyoxal hydrate with 50 cc. of methyl alcohol and then with 2.5 g. of is gently boiled for 2 hours, then cooled and filtered. The product is α-(p-phenylbenzoyl)-α-(4-carboxyphenylamino)-carbinol, M.P. 197° C.

Example 19

A mixture of 2.4 g. of the methylate addition product of biphenylyl-4-glyoxal and 1.7 g. of ethyl p-aminobenzoate in 100 cc. of methyl alcohol is heated at reflux for several hours. Evaporation of the solvent and cooling separates the methyl ether of α-(p-phenylbenzoyl)-α-(4-carbethoxyphenylamino)-carbinol.

Example 20

A mixture of 2.8 g. of the hydrate of 3'-chloro-4'-methoxybiphenylyl-4-glyoxal is reacted with 10 g. of citronellol as in Example 3 to give the citronellylate addition compound. A solution of the citronellylate (4.2 g.) and 1.4 g. of p-aminobenzoic acid in benzene is heated at 60° C. for 8 hours. Filtration and evaporation gives the desired 2,6-dimethylocten-1-yl-8 ether of α-(p-3-chloro-4-methoxyphenyl-benzoyl-α-(4-carboxyphenylamino)-carbinol.

What is claimed is:

1. A chemical compound selected from the group consisting of an acid having the formula:

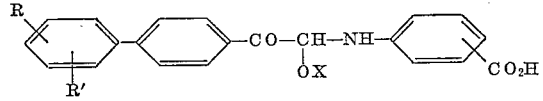

in which R is a member selected from the group consisting of hydrogen, halogen having an atomic weight less than 80, hydroxy, lower alkoxy of 1 to 4 carbon atoms, lower alkyl of 1 to 4 carbon atoms and benzyloxy; $R^1$ is a member selected from the group consisting of hydrogen and halogen; and X is a member selected from the group consisting of hydrogen, an aliphatic hydrocarbon radical of 1 to 12 carbon atoms and a monocyclic hydrocarbon radical containing no more than 12 carbon atoms; and pharmaceutically acceptable alkali metal salts of said acids.

2. A compound as claimed in claim 1 in which R is in 4'-position and $R^1$ is in the 3'-position.

3. A chemical compound having the following structural formula:

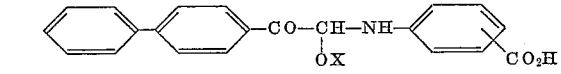

in which X is lower alkyl of 1 to 8 carbon atoms.

4. A chemical compound having the following structural formula:

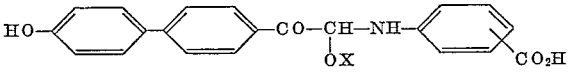

in which X is a lower alkyl of 1 to 8 carbon atoms.

5. A chemical compound having the following structural formula:

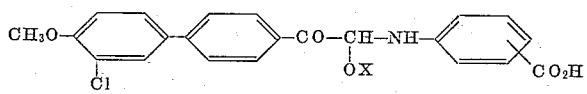

in which X is lower alkyl of 1 to 8 carbon atoms.

6. A chemical compound having the following structural formula:

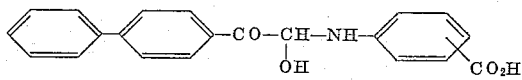

7. A chemical compound having the following structural formula:

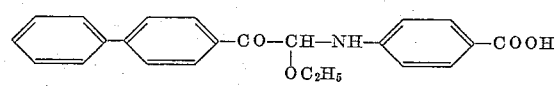

8. The method of preparing carbinol derivatives having the following structural formula:

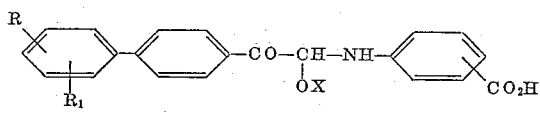

in which R is a member selected from the group consisting of hydrogen, halogen having an atomic weight less than 80, hydroxy, lower alkoxy of 1 to 4 carbon atoms, lower alkyl of 1 to 4 carbon atoms and benzyloxy; $R^1$ is a member selected from the group consisting of hydrogen and halogen; and X is a member selected from the group consisting of hydrogen, an aliphatic hydrocarbon radical of 1 to 12 carbon atoms and a monocyclic hydrocarbon radical containing no more than 12 carbon atoms, said method comprising reacting a biphenylyl glyoxal addition product having the following structural formula:

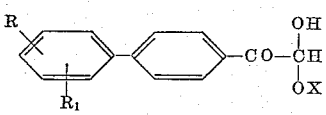

in which R, $R^1$ and X are as defined hereabove with an aminobenzoic acid in an inert organic solvent at reaction temperatures of from about room temperature up to the boiling point of said organic solvent.

References Cited in the file of this patent

UNITED STATES PATENTS 2,543,267    Bambas _____ Feb. 27, 1951

OTHER REFERENCES

Musante et al.: "Chem. Abst.," vol. 46 (1952), col. 4502–04.